(12) United States Patent
Yin et al.

(10) Patent No.: US 11,743,359 B2
(45) Date of Patent: Aug. 29, 2023

(54) SERVICE CACHING METHOD FOR A CROSS-BORDER SERVICE NETWORK

(71) Applicant: ZHEJIANG UNIVERSITY, Hangzhou (CN)

(72) Inventors: Jianwei Yin, Hangzhou (CN); Bangpeng Zheng, Hangzhou (CN); Shuiguang Deng, Hangzhou (CN); Huan Zhang, Hangzhou (CN); Shengye Pang, Hangzhou (CN); Yucheng Guo, Hangzhou (CN); Maolin Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/622,693

(22) PCT Filed: Mar. 3, 2021

(86) PCT No.: PCT/CN2021/078804
§ 371 (c)(1),
(2) Date: Dec. 23, 2021

(87) PCT Pub. No.: WO2022/121124
PCT Pub. Date: Jun. 16, 2022

(65) Prior Publication Data
US 2022/0407940 A1  Dec. 22, 2022

(30) Foreign Application Priority Data

Dec. 7, 2020  (CN) .......................... 202011437726.3

(51) Int. Cl.
*G06F 15/167* (2006.01)
*H04L 67/5682* (2022.01)

(52) U.S. Cl.
CPC .............. *H04L 67/5682* (2022.05)

(58) Field of Classification Search
CPC .................................................. H04L 67/5682
(Continued)

(56) References Cited

U.S. PATENT DOCUMENTS 5,499,354 A * 3/1996 Aschoff ............. G06F 12/0866
                                        711/E12.019
5,590,300 A * 12/1996 Lautzenheiser ..... G06F 12/0862
                                        711/E12.04
(Continued)

FOREIGN PATENT DOCUMENTS

CN        103634231         3/2014
CN        106131182         11/2016
(Continued)

*Primary Examiner* — Alicia Baturay
(74) *Attorney, Agent, or Firm* — Jiwen Chen; Joywin IP Law PLLC

(57) ABSTRACT

The present invention discloses a service caching method for a cross-border service network, wherein the method includes: a cache space of a service switch node is divided into a resident area, a change area, a pre-reclaimed area and a maintenance index area; among them, a cache hit frequency is: a resident area>a change area>a pre-reclaimed area, and the maintenance index area is used for separate storage services call path. when a service call is generated, a cache content in the cache space is replaced according to a cache value of a missed cache or a hit cache; a service router and service switch nodes in the corresponding area jointly form a hierarchical cache mode. When the cache space of any node in the service switch node is insufficient, the service switch nodes in the same area perform collaborative cache and store them in other cache space of the service switch node through indexing. The method provided by the present invention can improve the cache utilization efficiency in the cross-border service network, thereby accelerating service invocation.

9 Claims, 3 Drawing Sheets

(58) Field of Classification Search
USPC .......................................................... 709/213
See application file for complete search history.

(56) References Cited

U.S. PATENT DOCUMENTS

| | | | | |
|---|---|---|---|---|
| 5,594,885 | A * | 1/1997 | Lautzenheiser | G06F 11/1435 711/E12.04 |
| 5,615,353 | A * | 3/1997 | Lautzenheiser | G06F 11/1435 711/134 |
| 5,668,987 | A * | 9/1997 | Schneider | G06F 16/24552 |
| 5,745,729 | A * | 4/1998 | Greenley | G06F 9/3875 712/E9.046 |
| 5,802,575 | A * | 9/1998 | Greenley | G06F 9/3824 711/131 |
| 6,286,080 | B1 * | 9/2001 | Galbraith | G06F 11/3409 703/22 |
| 6,338,115 | B1 * | 1/2002 | Galbraith | G06F 12/127 711/213 |
| 6,711,652 | B2 * | 3/2004 | Arimilli | G06F 12/0813 711/146 |
| 6,857,045 | B2 * | 2/2005 | Galbraith | G06F 12/0866 711/134 |
| 6,877,065 | B2 * | 4/2005 | Galbraith | G06F 12/0866 711/E12.019 |
| 7,337,271 | B2 * | 2/2008 | Emma | G06F 9/3806 711/119 |
| 7,447,869 | B2 * | 11/2008 | Kruger | G06F 12/1009 711/208 |
| 7,539,843 | B2 * | 5/2009 | Kruger | G06F 12/1009 711/207 |
| 8,195,890 | B1 * | 6/2012 | James | G06F 12/0824 711/141 |
| 8,352,687 | B2 * | 1/2013 | Dunn Berger | G06F 12/0831 711/140 |
| 8,447,905 | B2 * | 5/2013 | Ambroladze | G06F 12/0897 710/243 |
| 8,543,771 | B1 * | 9/2013 | James | G06F 12/0824 711/141 |
| 8,560,803 | B2 * | 10/2013 | Orf | G06F 12/084 710/17 |
| 8,566,532 | B2 * | 10/2013 | Dunn Berger | G06F 12/0855 711/140 |
| 8,706,970 | B2 * | 4/2014 | Orf | G06F 12/084 711/E12.024 |
| 8,732,163 | B2 * | 5/2014 | Halasipuram | G06F 16/24549 707/720 |
| 8,996,819 | B2 * | 3/2015 | Dunn Berger | G06F 12/0811 711/140 |
| 9,003,125 | B2 * | 4/2015 | Ambroladze | G06F 12/0815 711/134 |
| 9,244,851 | B2 * | 1/2016 | Ambroladze | G06F 12/0815 |
| 9,372,810 | B2 * | 6/2016 | Voigt | G06F 12/0866 |
| 9,740,614 | B2 * | 8/2017 | Bradbury | G06F 9/467 |
| 9,740,615 | B2 * | 8/2017 | Bradbury | G06F 9/467 |
| 10,282,299 | B2 * | 5/2019 | Mukherjee | G06F 12/084 |
| 10,567,277 | B2 * | 2/2020 | Rath | H04L 67/63 |
| 10,691,613 | B1 * | 6/2020 | Tong | G06F 12/0868 |
| 11,010,210 | B2 * | 5/2021 | Sonnelitter, III | G06F 12/0811 |
| 11,030,115 | B2 * | 6/2021 | Colglazier | G06F 12/0895 |
| 11,037,269 | B1 * | 6/2021 | Schluessler | G06T 1/20 |
| 11,080,195 | B2 * | 8/2021 | Gal-On | G06F 12/0862 |
| 11,294,829 | B2 * | 4/2022 | Inoue | G06F 12/124 |
| 11,321,235 | B2 * | 5/2022 | Joo | G06F 9/30101 |
| 11,443,406 | B2 * | 9/2022 | Schluessler | G06T 1/60 |
| 11,449,397 | B2 * | 9/2022 | Fredeman | G06F 11/1666 |
| 11,461,151 | B2 * | 10/2022 | Sonnelitter, III | G06F 12/0802 |
| 11,462,266 | B1 * | 10/2022 | Kim | G11C 13/0064 |
| 11,470,176 | B2 * | 10/2022 | Enguehard | H04N 21/25891 |
| 11,487,672 | B1 * | 11/2022 | Rhee | G06F 12/0891 |
| 2012/0297009 | A1 * | 11/2012 | Amir | H04L 67/2885 709/213 |
| 2014/0281232 | A1 * | 9/2014 | Hagersten | G06F 12/0862 711/119 |
| 2015/0052314 | A1 | 2/2015 | Fujii et al. | |
| 2015/0378900 | A1 * | 12/2015 | Bradbury | G06F 12/0897 711/122 |
| 2015/0378901 | A1 * | 12/2015 | Bradbury | G06F 12/0811 711/122 |
| 2016/0357791 | A1 * | 12/2016 | Levandoski | G06F 9/46 |
| 2017/0091117 | A1 * | 3/2017 | Cain, III | G06F 12/0842 |
| 2022/0188230 | A1 * | 6/2022 | Song | G06F 12/0871 |
| 2022/0245203 | A1 * | 8/2022 | Wang | G06F 16/9538 |
| 2022/0269615 | A1 * | 8/2022 | Mola | G06F 9/45558 |
| 2022/0283296 | A1 * | 9/2022 | Zhang | G01S 13/867 |
| 2022/0291955 | A1 * | 9/2022 | Mrozek | G06F 9/30065 |
| 2022/0358039 | A1 * | 11/2022 | Favor | G06F 12/1036 |
| 2022/0358046 | A1 * | 11/2022 | Favor | G06F 12/0811 |
| 2022/0358048 | A1 * | 11/2022 | Favor | G06F 12/0895 |
| 2022/0358052 | A1 * | 11/2022 | Favor | G06F 12/0811 |

FOREIGN PATENT DOCUMENTS

| | | |
|---|---|---|
| CN | 107948247 | 4/2018 |
| CN | 110933692 | 3/2020 |

* cited by examiner

SERVICE CACHING METHOD FOR A CROSS-BORDER SERVICE NETWORK

This is a U.S. national stage application of PCT Application No. PCT/CN2021/078804 under 35 U.S.C. 371, filed Mar. 3, 2021 in Chinese, claiming priority to Chinese Patent Applications No. 202011437726.3, filed Dec. 7, 2020, all of which are hereby incorporated by reference.

FIELD OF TECHNOLOGY

The present invention belongs to a field of cross-border service integration and computing, and particularly relates to a service caching method oriented to a cross-border service network.

BACKGROUND TECHNOLOGY

With the development of network information technology, the Internet era has come in an all-round way. Among them, Web service is an important carrier of Internet product research and development. Its introduction has improved the development efficiency of engineers and the iterative cycle of products. Web service is a service-oriented architecture technology, which is a software system that provides services through standard Web protocols, hides service implementation details, supports communication between different machines, and ensures that cross-platform, cross-language, and cross-protocol application services can interoperate.

More and more web services are published on the Internet by enterprises, and service opening has become the development trend of the Internet. Third-party web services have penetrated every bit of people's lives to improve people's quality of life. In 2017, the API general resource website Programmable Web announced that the number of APIs in the website directory had reached 5000 and predicted that eventually all companies will have their own APIs, including government departments. Opening services, realizing data sharing, and assigning value to data can not only bring additional economic benefits to enterprises, but also serve as a development strategy for enterprises. However, most companies now open services independently, and the services are in an isolated state. These Web services that cross the boundaries of different industries, organizations, regions, and value chains are called cross-border services. How to integrate and reuse cross-border services has become a major challenge for subject research. For example, the Chinese patent document with the publication number CN109286530A discloses a cross-border service network operation and support architecture. The cross-border service network is defined as an undirected graph of a tetrad (V, E, ρ, f, event), wherein the V is a node set, the E is an undirected graph edge set, the p is a node quality evaluation function, the f is a mapping relationship between the service and a service switch node and a service router node, and the event is an event; the service switch node is responsible for transforming an enterprise service into a unified service style and then be opened to a cross-border service network; the service router node synchronizes the service opened by the service switch to the cross-border service network, forwards a service request of a service consumer to accelerate the service consumption, provides a support carrier for the service standardization and the service combination; the service super node is responsible for management of the service router, the service switch and a message queue; in a cross-border service network, the communication mechanism of nodes includes a service information event broadcast mechanism and a service call routing mechanism.

In the cross-border service network architecture, a routing path is established between service nodes through a service routing mechanism, and then a service call is initiated to obtain service resources. With the increase in the number of service calls, direct service calls between nodes will bring huge pressure to the service nodes, which will bring a huge burden to the entire service network. The increase in the number of nodes results in a more complex network topology, and direct service calls often result in a relatively slow return speed, which affects the return speed of user service calls. Therefore, service caching technology is needed, that is, to cache the results of service invocations, and no longer occupy service resources when a cache hit occurs in the service invocation phase, and directly speed up service invocations through the cache return method, increase the speed of service invocations, and reduce the cost of cross-border service networks. The overall burden is to improve the user's experience of invoking the service.

SUMMARY OF THE INVENTION

The object of the present invention is to propose a service caching method oriented to a cross-border service network, which can improve the cache utilization efficiency in the cross-border service network, thereby accelerating service invocation.

In order to achieve the above objectives, the present invention provides the following technical solutions:

A service caching method for a cross-border service network, comprising: dividing a cache space of a service switch node into a resident area, a change area, a pre-reclaimed area and a maintenance index area; wherein, a cache hit frequency is: a resident area>a change area>a pre-reclaimed area, and the maintenance index area is used for separate storage services call path;

when a service call is generated, replacing a cache content in the cache space according to a cache value of a missed cache or a hit cache;

a service router and service switch nodes in the corresponding area jointly forming a hierarchical cache mode, wherein when the cache space of any node in the service switch node is insufficient, the service switch nodes in the same area perform collaborative cache and store them in other cache space of the service switch node through indexing.

Among them, the content cached in the resident area is the cache content that has been frequently called recently (cache hit frequency), the content cached in the pre-reclaimed area is the cache content that is called less frequently, and the calling frequency of the content in the change area is between the resident area and the pre-reclaimed area. According to actual needs, the cache hit frequency range of the resident area, the change area and the pre-reclaimed area can be set, for example, the resident area is 81%-100%, the change area is 51%-80%, and the pre-reclaimed area is less than 50%.

Preferably, a pace allocation of the cache space is: the change area>the resident area=the pre-claimed area>the maintenance index area; a cache tolerance and cache survival time are: resident area>change area>pre-claimed area. For example, the ratio of the resident area and the pre-reclaimed area to the cache space is less than or equal to 20%, the ratio of the variable area to the cache space is less than or equal to 60%, and the remaining cache space is the maintenance index area.

For the division ratio between cache tolerance and cache lifetime: the resident area stores the hot information in the cache service call, that is, it has been frequently called in the recent period of time. For this category of service call information, the node will allocate greater cache tolerance and cache lifetime. The service call information stored in the change area is often replaced in the cache, for this category of service call information, nodes will allocate relatively less cache tolerance and cache lifetime. The pre-reclaimed area stores cached content with a low cache hit rate, which is a cache that is not frequently used, for this type of information node, the least cache tolerance and cache lifetime will be allocated.

Preferably, according to the cache hit frequency, the cache content in the resident area and the change area are replaced with each other. The cache content in the change area is replaced with the pre-claimed area. The cache content in the pre-claimed area is removed from the cache space after losing the cache tolerance and the cache survival space. That is, the content cached in the resident area and the variable area can be converted mutually, the content cached in the variable area and the pre-reclaimed area can be mutually converted, and the content cached in the pre-reclaimed area cannot be directly converted to the resident area.

A method of the cache content in the cache space is replaced according to the cache value of the missed cache or the hit cache is:

(1) when a service call is generated, if it hits the cache, executing step (2), if it misses the cache, executing step (3).

(2) updating the cache value of the hit cache, and judging the hit cache as a complete hit cache or a partial hit cache according to the cache value; if it is a complete hit cache, the service call returns, if the cache is a partial hit cache, the cache is partially replaced; checking the area where the cache is located, if necessary for partition adjustment, the cache space area is replaced.

(3) checking whether there is a corresponding cached call path information in the index area, if there is, then performing the corresponding service call, if not, re-initiating a service call process;

replacing the cache with the lowest cache value in the pre-reclaimed area according to a result of the service call, and replacing the required cache into the change area. If the storage space in the change area is full, replacing the cache with the lowest cache value to the pre-reclaimed area according to the cache value of the cache in the change area.

In step (2), a calculation formula for the cache value is:

$$V = \sum_{i=1}^{n} \text{Size}(i) \times (Fr(i)/(T_{now} - T_{score}))$$

Wherein, V represents a cache value, Size(i) represents a size of the i-th parameter in the service call information that needs to be cached, Fr is a function related to access frequency, $T_{now}$ represents a current time, $T_{score}$ represents a time recorded when the cache enters;

$$Fr(i) = \begin{cases} Fr(i)+1, & \text{if hit cache} \\ Fr(i), & \text{else} \end{cases}$$

that is, when the cache hits, the function value increases by one, and when the cache misses, the function value does not change.

In step (2), when the cache is completely hit, checking the location mark of the cache. If the cache is in the change area, checking whether the current cache value reaches a threshold of the change area. If the threshold is reached, adjusting the cache from the change area to the resident area; if the cache is in the pre-reclaimed area, checking whether the current cache reaches a threshold of the pre-reclaimed area; if it exceeds the threshold of the pre-reclaimed area, adjusting the cache from the pre-reclaimed area to the change area.

In step (2), when the cache is partially hit, updating the cache content and partially replace the information that needs to be stored into the cache space; checking a location mark of the cache, checking whether the cache reaches the corresponding area threshold, if it does, changing the area mark where the cache is located.

When the cache is replaced out of the cache space, the content in the storage space is replaced, and at the same time, a service call path corresponding to the cache is reserved to the index area, the index area is managed by the LRU (least recently used) strategy to improve the efficiency of the index area.

A method of when the cache space of any node in the service switch node is insufficient, the service switch nodes in the same area perform collaborative cache and store them in other cache space of the service switch node through indexing is:

(1) when the cache space in the service switch node i is insufficient, initiating a collaborative cache process in the area;

(2) the service router maintains the node value of the service switch node in the area;

(3) selecting a node j with the lowest node value in the area, the node i will forward the content that needs to be cached to the node j, and it will be saved by the node j, and the node j will return the specific storage location of the cache to the node i; the node i will save the index in a form of <$IP_j$, index>;

(4) after the node i is hit and cached, it will initiate a cache hit request to the node j through the index, along with the address of the service call initiator, after the node j learns the address, it returns the cache of the service call result to the service call initiator;

(5) when a service hotspot phenomenon occurs at the node j, and the cache value of the remaining caches is greater than the value of the collaborative cache initiated by the node i, the node j will replace the collaborative cache at this time, and at the same time send the cache invalidation information to the node i, after receiving the cache invalidation message, the node i will re-initiate a collaborative cache request in the area;

(6) after the service hot spot phenomenon in node i disappears, node i will initiate a request to all cooperative cache nodes, and other nodes will invalidate the cooperative cache in this node after receiving the message.

Wherein, the service hot spot phenomenon in steps (5) and (6) refers to insufficient cache space.

In step (2), a calculation formula of the node value is:

$$\text{Value}(i) = \text{Value}(i)_{static} * \frac{\text{Load}_i}{\sum_{i}^{n} \text{Load}_i}$$

wherein, $\text{Load}_i$ is the current load of the node i, n is the number of nodes in the area, and Value(i) static is the static node value calculated according to the network topology:

$$\text{Value}(i)_{static} = \sum_{j}^{n} \sum_{k \neq j}^{n} \frac{R_{jk}(i)}{R_{jk}}$$

wherein, $R_{jk}$ s the number of shortest paths between any two nodes j and k in the area, $R_{jk}(i)$ is the number of shortest paths passing through the node i, and n is the number of nodes in the area;

$$\text{Load}_i = \frac{\sum_{i=0}^{n} V(i)}{\rho}$$

wherein, V(i) is the node cache value, and ρ is the remaining rate of cache space in the area.

In the present invention, the node cache in the area improves the utilization efficiency of the cache in the entire area through collaborative cache, expands the logical cache space of a single node, and relieves the pressure of the single node cache during the peak period of service invocation.

Compared with the prior art, the present invention has the beneficial effect of dividing the cache space by the software, which can solve the problem of excessively long service cache occupation time caused by service peak calls in a short period of time, so as to improve the utilization efficiency of cache space. By calculating the cache value, the cache content in the cache space is optimally replaced, and the utilization efficiency of the node cache space is effectively improved, thereby accelerating service calls. Through the use of collaborative caching, in the same area, that is, the logical cache space of a single node is expanded when the total cache space in the area remains unchanged, and the cache space of each node is optimally used, thereby reducing the cost of a single node during the peak service call, and improving cache efficiency.

DESCRIPTION OF THE EMBODIMENTS

In order to make the objects, technical solutions, and advantages of the present invention clearer, the following further describes the present invention in detail with reference to the accompanying drawings and embodiments. It should be understood that the specific embodiments described herein are only used to explain the present invention, and do not limit the protection scope of the present invention.

A service caching method for a cross-border service network provided by the present invention includes:

a cache space of a service switch node is divided into a resident area, a change area, a pre-reclaimed area and a maintenance index area; among them, a cache hit frequency is: a resident area>a change area>a pre-reclaimed area, and the maintenance index area is used for separate storage services call path;

when a service call is generated, a cache content in the cache space is replaced according to a cache value of a missed cache or a hit cache;

a service router and service switch nodes in the corresponding area jointly form a hierarchical cache mode. When the cache space of any node in the service switch node is insufficient, the service switch nodes in the same area perform collaborative cache and store them in other cache space of the service switch node through indexing.

Figure 1:
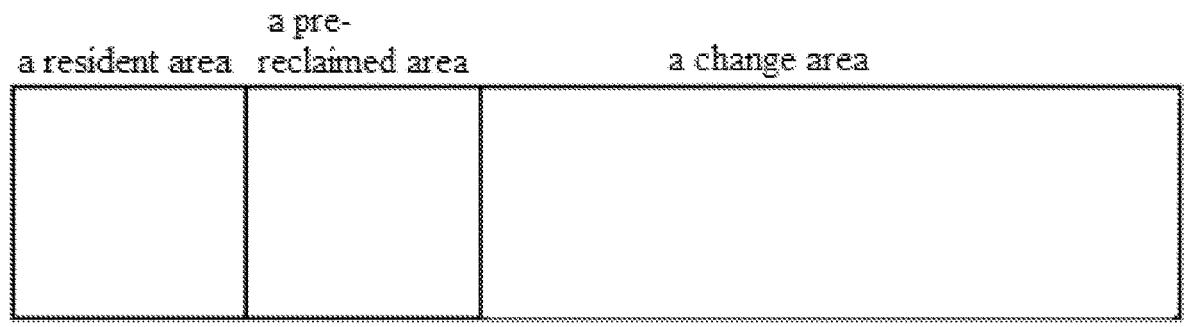
FIG. 1 is a diagram of the buffer space division of the service switch node.

Wherein, a pace allocation of the cache space is: the change area>the resident area=the pre-reclaimed>the maintenance index area; a cache tolerance and cache survival time are: resident area>change area>pre-reclaimed area. The resident area stores the hot information in the cache service call, that is, it has been frequently called in the recent period of time. For this category of service call information, the node will allocate greater cache tolerance and cache lifetime. The service call information stored in the change area is often replaced in the cache, for this category of service call information, nodes will allocate relatively less cache tolerance and cache lifetime. The pre-reclaimed area stores cached content with a low cache hit rate, which is a cache that is not frequently used, for this type of information node, the least cache tolerance and cache lifetime will be allocated. Wherein, FIG. 1 is a diagram showing the division of the cache space within the cache space node of the service switch node. For example, the space of the three areas is allocated as the resident area and the pre-reclaimed area each occupy about 20% of the cache space, and the variable area occupies about 60% of the cache space.

According to the cache hit frequency, the cache content in the resident area and the change area are replaced with each other. The cache content in the change area is replaced with the pre-reclaimed area. The cache content in the pre-reclaimed area is removed from the cache space after losing the cache tolerance and the cache survival space. For example, after the service invocation information in the change area is used relatively frequently, after exceeding the upper threshold of the cache hit frequency in the change area, it will be transformed from the change area to the resident area. After the use frequency of the cache in the change area decreases, after it is lower than the lower threshold of the cache hit frequency in the change area, it will be converted from the change area to the pre-reclaimed area. The service information of the resident area will be transferred from the resident area to the change area after the hit frequency drops to the lower threshold of the cache hit frequency of the resident area. The service information in the pre-reclaimed area is removed from the cache space after the cache tolerance and cache survival space are lost. The service information is in the change area when it is replaced into the cache for the first time.

Figure 2:
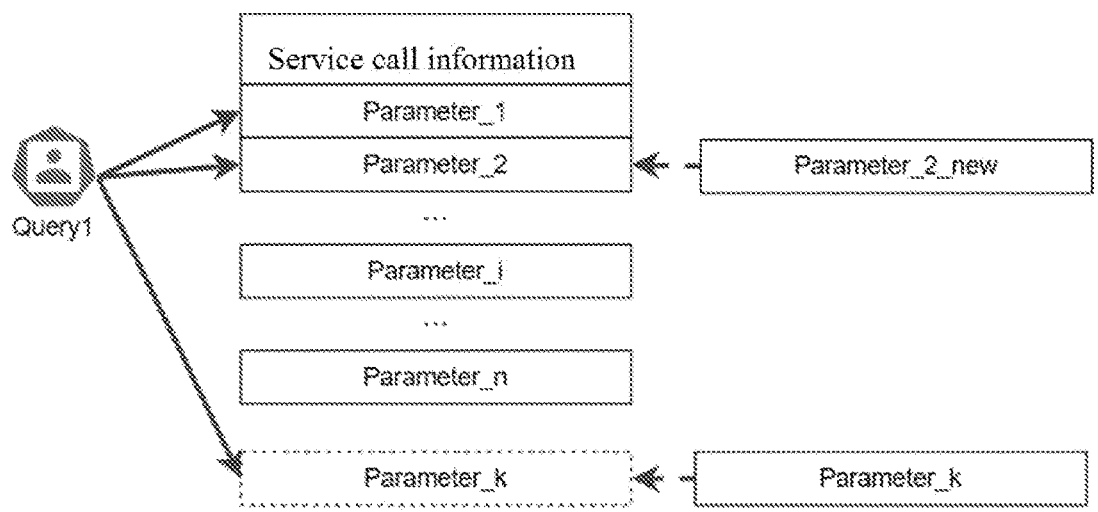
FIG. 2 is a partial replacement diagram of service invocation information in the cache space.

FIG. 2 is a partial replacement diagram of service call information in the cache space. When the service call Query hit the cache, first check the parameters required by the Query, and find that the three parameters Parameter_1, Parameter_2, and Parameter_k are hit, and the content in the Parameter_2 cache is the same as the actual provided content of the current service has been different, so it needs to be replaced with Parameter_2_new, while the content of Parameter_k is missed. At this time, the required content is transferred to the cache to achieve partial replacement, and the service call information will not be replaced as a whole replacement situation.

Figure 3:
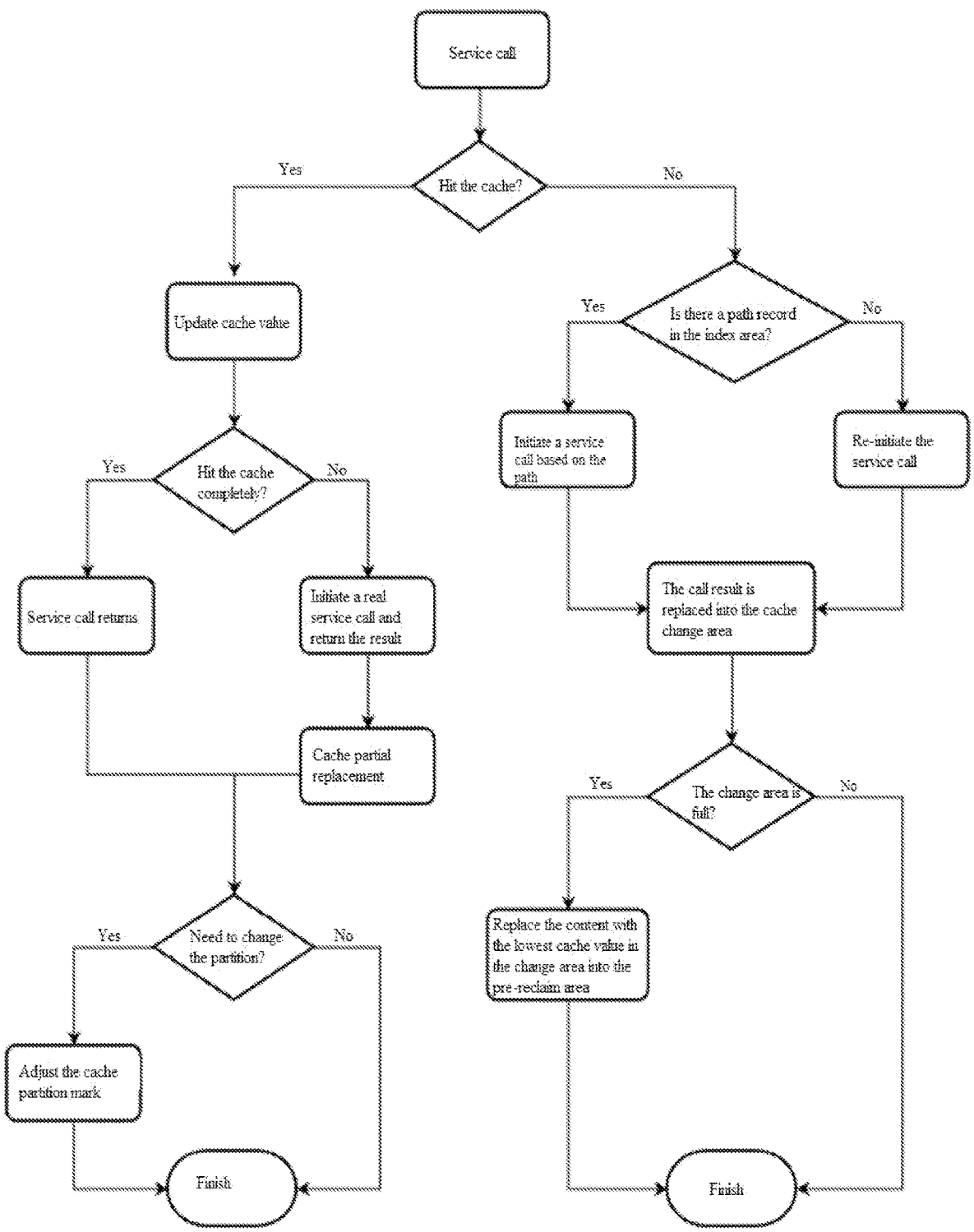
FIG. 3 is a flowchart of a service cache replacement method.

As shown in FIG. 3, A method of the cache content in the cache space is replaced according to the cache value of the missed cache or the hit cache is:

(1) when a service call is generated, if it hits the cache, executing step (2), if it misses the cache, executing step (6).

(2) updating the cache value of the hit cache, a calculation formula for the cache value is:

$$V = \sum_{i=1}^{n} Size(i) \times (Fr(i)/(T_{now} - T_{score}))$$

Wherein, V represents a cache value, Size(i) represents a size of the i-th parameter in the service call information that needs to be cached, Fr is a function related to an access frequency, $T_{now}$ represents a current time, T score represents a time recorded when the cache enters;

$$Fr(i) = \begin{cases} Fr(i)+1, & \text{if hit cache} \\ Fr(i), & \text{else} \end{cases}$$

that is, when the cache hits, the function value increases by one, and when the cache misses, the function value does not change.

(3) In the case of a cache hit, check whether the cache is completely hit, if the cache is completely hit, go to step (4), if the cache hits partially, go to step (5).

(4) when the cache is completely hit, checking the location mark of the cache. If the cache is in the change area, checking whether the current cache value reaches a threshold of the change area. If the threshold is reached, adjusting the cache from the change area to the resident area; if the cache is in the pre-reclaimed area, checking whether the current cache reaches a threshold of the pre-reclaimed area; if it exceeds the threshold of the pre-reclaimed area, adjusting the cache from the pre-reclaimed area to the change area.

(5) updating the cache content and partially replace the information that needs to be stored into the cache space; checking a location mark of the cache, checking whether the cache reaches the corresponding area threshold, if it does, changing the area mark where the cache is located.

When the cache is replaced out of the cache space, the content in the storage space is replaced, and at the same time, a service call path corresponding to the cache is reserved to the index area, the index area is managed by the LRU strategy to improve the efficiency of the index area.

(6) checking whether there is a corresponding cached call path information in the index area, if there is, then performing the corresponding service call, if not, re-initiating a service call process;

replacing the cache with the lowest cache value in the pre-reclaimed area, and replacing the required cache into the change area. If the storage space in the change area is full, replacing the cache with the lowest cache value to the pre-reclaimed area according to the cache value of the cache in the change area.

Figure 4:
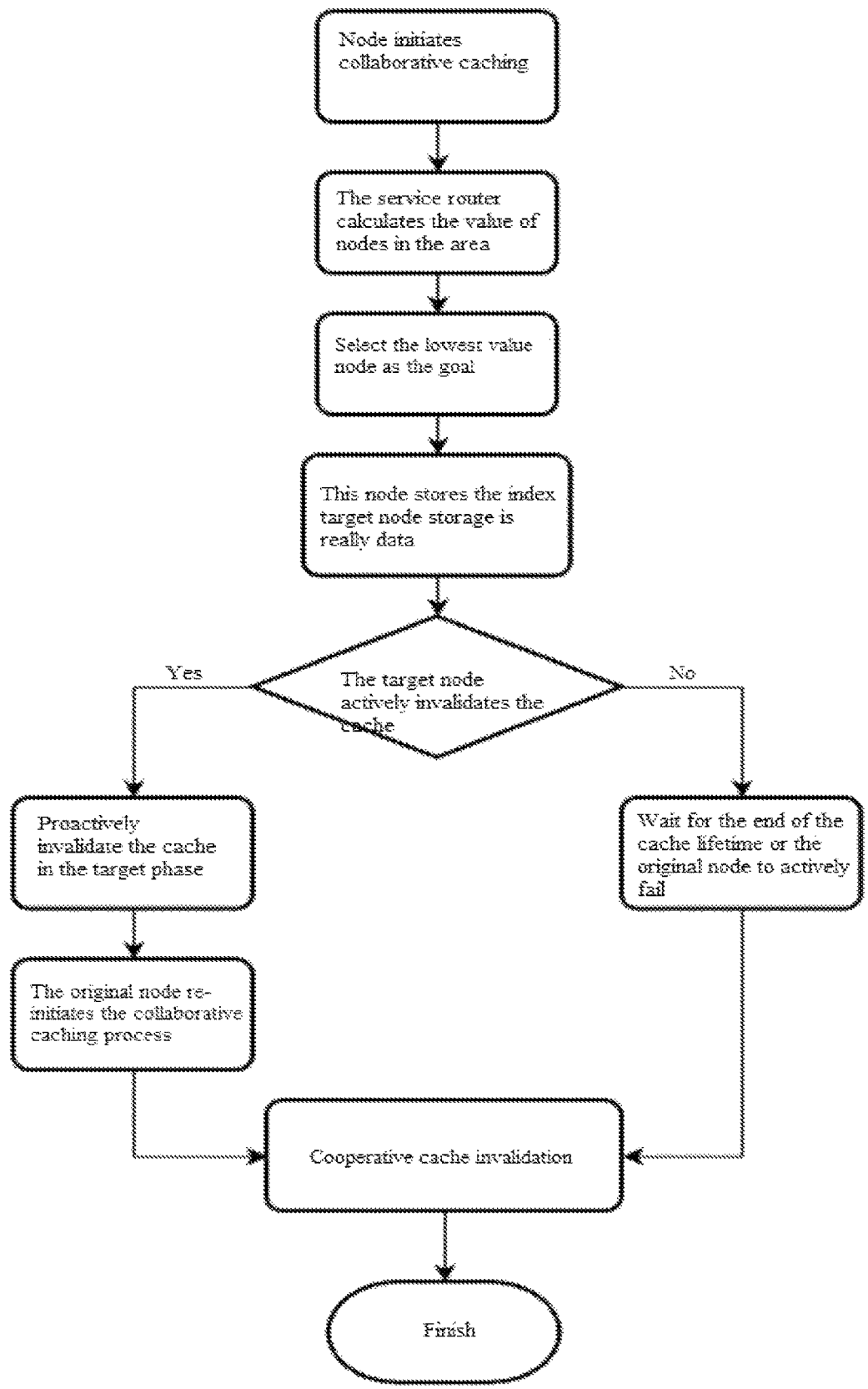
FIG. 4 is a flowchart of a collaborative caching method in an area.

As shown in FIG. 4, when the cache space of any node in the service switch node is insufficient, a method of the service switch nodes in the same area performs collaborative cache and store them in other cache space of the service switch node through indexing is:

(1) when the cache space in the service switch node i is insufficient, initiating a collaborative cache process in the area;

(2) the service router maintains the node value of the service switch node in the area; a calculation formula of the node value is:

$$Value(i) = Value(i)_{static} * \frac{Load_i}{\sum_{i}^{n} Load_i}$$

wherein, $Load_i$ is the current load of the node i, n is the number of nodes in the area, and $Value(i)_{static}$ is the static node value calculated according to the network topology:

$$Value(i)_{static} = \sum_{j}^{n} \sum_{k \neq j}^{n} \frac{R_{jk}(i)}{R_{jk}}$$

wherein, $R_{jk}$ s the number of shortest paths between any two nodes j and k in the area, $R_{jk}(i)$ is the number of shortest paths passing through the node i, and n is the number of nodes in the area;

$$Load_i = \frac{\sum_{i=0}^{n} V(i)}{\rho}$$

wherein, V(i) is the node cache value, and ρ is the remaining rate of cache space in the area.

(3) selecting a node j with the lowest node value in the area, the node i will forward the content that needs to be cached to the node j, and it will be saved by the node j, and the node j will return the specific storage location of the cache to the node i; the node i will have the index in a form of <$IP_j$, index>;

(4) after the node i is hit and cached, it will initiate a cache hit request to the node j through the index, along with the address of the service call initiator, after the node j learns the address, it returns the cache of the service call result to the service call initiator;

(5) when a service hotspot phenomenon occurs at the node j, and the cache value of the remaining caches is greater than the value of the collaborative cache initiated by the node i, the node j will replace the collaborative cache at this time, and at the same time send the cache invalidation information to the node i, after receiving the cache invalidation message, the node i will re-initiate a collaborative cache request in the area;

(6) after the service hot spot phenomenon in node i disappears, node i will initiate a request to all cooperative cache nodes, and other nodes will invalidate the cooperative cache in this node after receiving the message.

The specific implementations described above describe the technical solutions and beneficial effects of the present invention in detail. It should be understood that the above descriptions are only the most preferred embodiments of the present invention and are not intended to limit the present invention. Any modifications, additions and equivalent replacements made within the scope shall be included in the protection scope of the present invention.

The invention claimed is:

1. A service caching method for a cross-border service network, wherein the method comprises:

dividing a cache space of a service switch node into a resident area, a change area, a pre-reclaimed area and a maintenance index area, wherein, a cache hit frequency is: a resident area>a change area>a pre-reclaimed area, and the maintenance index area is used for separate storage services call path;

when a service call is generated, replacing a cache content in the cache space according to a cache value of a missed cache or a hit cache;

a service router and service switch nodes in the corresponding area jointly forming a hierarchical cache mode, wherein when the cache space of any node in the service switch node is insufficient, the service switch nodes in the same area perform collaborative cache and store the cache content in other cache space of the service switch node through indexing;

wherein, a pace allocation of the cache space is: the change area>the resident area=the pre-reclaimed>the maintenance index area; a cache tolerance and cache survival time are: resident area>change area>pre-reclaimed area;

wherein ">" means "being larger than" and "=" means "being equal to".

2. The service caching method for a cross-border service network according to claim 1, wherein, according to the cache hit frequency, the cache content in the resident area and the change area are replaced with each other; the cache content in the change area is replaced with the pre-reclaimed area; the cache content in the pre-reclaimed area is removed from the cache space after losing the cache tolerance and the cache survival space.

3. The service caching method for a cross-border service network of claim 1, wherein, a method of the cache content in the cache space is replaced according to the cache value of the missed cache or the hit cache is:

(1) when a service call is generated, if it hits the cache, executing step (2), if it misses the cache, executing step (3);

(2) updating the cache value of the hit cache, and judging the hit cache as a complete hit cache or a partial hit cache according to the cache value; if it is a complete hit cache, the service call returns, if the cache is a partial hit cache, the cache is partially replaced; checking the area where the cache is located, if necessary for partition adjustment, the cache space area is replaced;

(3) checking whether there is a corresponding cached call path information in the index area, if there is, then performing the corresponding service call; if not, re-initiating a service call process;

replacing the cache with the lowest cache value in the pre-reclaimed area according to a result of the service call, and replacing the required cache into the change area; if the storage space in the change area is full, replacing the cache with the lowest cache value to the pre-reclaimed area according to the cache value of the cache in the change area.

4. The service caching method for a cross-border service network according to claim 3, wherein, in step (2), a calculation formula for the cache value is:

$$V = \sum_{i=1}^{n} \text{Size}(i) \times (Fr(i) / (T_{now} - T_{score}))$$

wherein, V represents a cache value, Size(i) represents a size of the i-th parameter in the service call information that needs to be cached, Fr is a function related to an access frequency, $T_{now}$ represents a current time, $T_{score}$ represents a time recorded when the cache enters;

$$Fr(i) = \begin{cases} Fr(i) + 1, & \text{if hit cache} \\ Fr(i), & \text{else} \end{cases}$$

that is, when the cache hits, the function value increases by one, and when the cache misses, the function value does not change.

5. The service caching method for a cross-border service network according to claim 3, wherein, in step (2), when the cache is completely hit, checking the location mark of the cache; if the cache is in the change area, checking whether the current cache value reaches a threshold of the change area; if the threshold is reached, adjusting the cache from the change area to the resident area; if the cache is in the pre-reclaimed area, checking whether the current cache reaches a threshold of the pre-reclaimed area; if it exceeds the threshold of the pre-reclaimed area, adjusting the cache from the pre-reclaimed area to the change area.

6. The service caching method for a cross-border service network according to claim 3, wherein, in step (2), when the cache is partially hit, updating the cache content and partially replace the information that needs to be stored into the cache space;

checking a location mark of the cache, checking whether the cache reaches the corresponding area threshold, if it does, changing the area mark where the cache is located.

7. The service caching method for a cross-border service network according to claim 6, wherein, when the cache is replaced out of the cache space, the content in the storage space is replaced, and at the same time, a service call path corresponding to the cache is reserved to the index area, the index area is managed by the LRU (least frequently used) strategy to improve the efficiency of the index area.

8. The service caching method for a cross-border service network according to claim 1, wherein, a method of when the cache space of any node in the service switch node is insufficient, the service switch nodes in the same area perform collaborative cache and store cache content in other cache space of the service switch node through indexing is:

(1) when the cache space in the service switch node i is insufficient, initiating a collaborative cache process in the area;

(2) the service router maintains the node value of the service switch node in the area;

(3) selecting a node j with the lowest node value in the area, the node i will forward the content that needs to be cached to the node j, and it will be saved by the node j, and the node j will return the specific storage location of the cache to the node i; the node i will save the index in a form of <$IP_j$, index>;

(4) after the node i is hit and cached, the node i will initiate a cache hit request to the node j through the index, along with the address of the service call initiator, after the node j learns the address, it returns the cache of the service call result to the service call initiator;

(5) when a service hotspot phenomenon occurs at the node j, and the cache value of the remaining caches is greater than the value of the collaborative cache initiated by the node i, the node j will replace the collaborative cache at this time, and at the same time send the cache invalidation information to the node i, after receiving the cache invalidation message, the node i will re-initiate a collaborative cache request in the area;

(6) after the service hot spot phenomenon in node i disappears, node i will initiate a request to all cooperative cache nodes, and other nodes will invalidate the cooperative cache in this node after receiving the message.

9. The service caching method for a cross-border service network according to claim 8, wherein, in step (2), a calculation formula of the node value is:

$$\text{Value}(i) = \text{Value}(i)_{static} * \frac{\text{Load}_i}{\sum\limits_{i}^{n} \text{Load}_i}$$

wherein, $\text{Load}_i$ is the current load of the node ii, n is the number of nodes in the area, and $\text{Value}(i)_{static}$ is the static node value calculated according to the network topology:

$$\text{Value}(i)_{static} = \sum_{j}^{n} \sum_{k \neq j}^{n} \frac{R_{jk}(i)}{R_{jk}}$$

wherein, $R_{jk}$ s the number of shortest paths between any two nodes j and k in the area, $R_{jk}(i)$ is the number of shortest paths passing through the node i, and n is the number of nodes in the area;

$$\text{Load}_i = \frac{\sum\limits_{i=0}^{n} V(i)}{\rho}$$

wherein, V(i) is the node cache value, and ρ is the remaining rate of cache space in the area.

* * * * *